Figure 1:
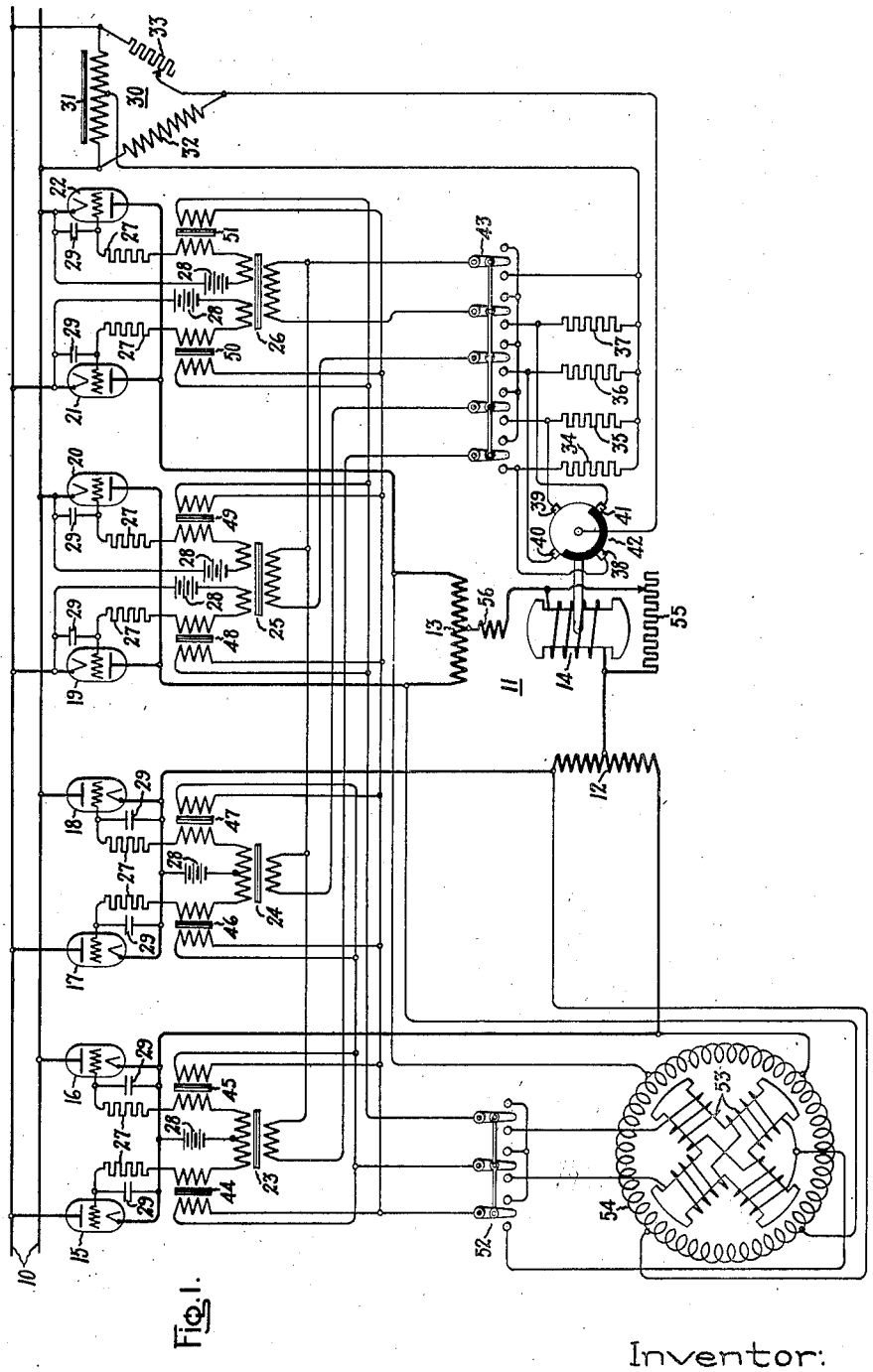

Nov. 28, 1933.　　　　E. F. W. ALEXANDERSON　　　　1,937,377
ELECTRIC VALVE CONVERTING SYSTEM
Filed March 12, 1932　　　2 Sheets-Sheet 2

Inventor:
Ernst F. W. Alexanderson
by
His Attorney.

Patented Nov. 28, 1933

1,937,377

UNITED STATES PATENT OFFICE 1,937,377

ELECTRIC VALVE CONVERTING SYSTEM

Ernst F. W. Alexanderson, Schenectady, N. Y., assignor to General Electric Company, a corporation of New York Application March 12, 1932. Serial No. 598,380

32 Claims. (Cl. 172—274)

My invention relates to electric valve converting systems, and more particularly to such systems adapted to transmit energy from an alternating current supply circuit to a variable frequency alternating current load circuit or device, such for example, as an alternating current motor.

Heretofore, there have been proposed various electric valve converting systems for transmitting energy from an alternating current supply circuit to an electric translating circuit of either constant or variable frequency. In such arrangements it has been customary to interconnect the translating circuit with two groups of grid controlled electric valves which, together with their associated circuits, comprise a pair of rectifiers connected to alternately supply unidirectional current of opposite polarity to the electric translating apparatus. In such arrangements it has been found preferable to use valves of the vapor electric discharge type because of the relatively large amounts of energy which may be handled at ordinary operating voltages. With the use of vapor electric discharge devices in such arrangements, however, the failure of the grid circuit of any of the electric valves tends to produce a short circuit on the alternating current circuit, or on the electric transmitting apparatus, or both. Furthermore, when utilizing such apparatus for operating an alternating current motor at variable speed, no satisfactory arrangement has been proposed for controlling the electric valves at the various operating speeds of the motor.

It is an object of my invention, therefore, to provide an improved electric valve converting system for transmitting energy from an alternating current supply circuit to an electric translating apparatus which will overcome the above mentioned disadvantages of the arrangements of the prior art, and which will be simple and reliable in operation.

It is a further object of my invention to provide an improved electric valve converting system for transmitting energy from a source of alternating current to an electric translating apparatus in which the occurrence of short circuits on the apparatus or the alternating current supply circuit occasioned by the failure of an electric valve will be substantially eliminated.

It is a further object of my invention to provide an improved electric valve converting system which is particularly suitable for transmitting energy from an alternating current supply circuit to a variable speed alternating current motor.

It is a still further object of my invention to provide an improved arrangement for controlling the valves of an electric valve converting system which is of general application but which is particularly suitable for controlling the grids of the valves of an electric valve converting system embodying my invention.

In accordance with one embodiment of my invention, an alternating current supply circuit is interconnected with an electric translating apparatus comprising a plurality of phase windings, such for example, as a polyphase alternating current motor, through a plurality of electric valves. One group of electric valves interconnects the supply circuit with one of the phase windings and all of the valves are connected with the same polarity with respect to the alternating current circuit. Similarly, another phase winding of the translating apparatus is connected to the supply circuit through a second group of electric valves, all connected with opposite polarity with respect to the supply circuit, and an interconnection is provided between the two phase windings. With such an arrangement current is continuously fed from the alternating current supply circuit into one phase winding, the valves being so controlled as to periodically transfer it between the several terminals of the winding; is then transmitted through another phase winding, and returned through the valves associated therewith to the alternating current circuit, the return current being periodically transferred between the terminals of the second winding in a similar manner. In this manner the current commutated between the several terminals of a single-phase winding always flows in the same direction so that a failure of the grid circuit of any one of the valves does not cause a short circuit current. In accordance with another feature of my invention when applied to the operation of a variable speed alternating current motor, the interconnection between the several phase windings, which carries unidirectional current, may comprise the field winding of the alternating current motor. When this latter arrangement is used it has been found desirable to control the grids of the several electric valves by means of a distributor driven directly from the motor rotor. For starting the operation of the motor the grid potential for the several valves may be derived from a phase shifting circuit energized from the alternating current circuit in order to reduce the average voltage impressed upon the motor armature winding. This alternating potential, variable in phase, is connected in series with the distributor in order to excite the grids of the several electric valves in the proper sequence. When the motor of such an arrangement reaches a speed of approximately one-half synchronous speed, it has been found preferable to excite the grids of the several electric valves in accordance with the counter-electromotive force developed by the motor in order to operate at the highest efficiency.

Figure 2:
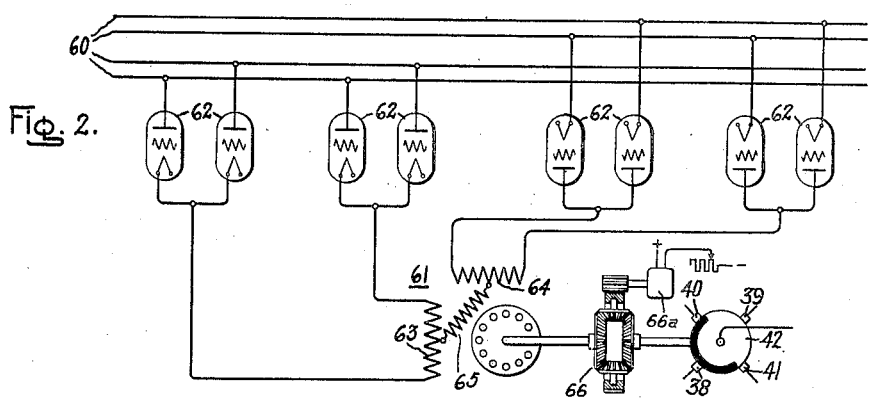
Figure 3:
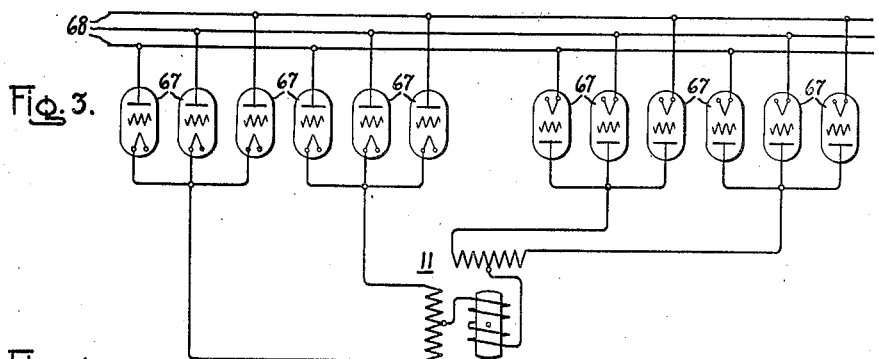
Figure 4:
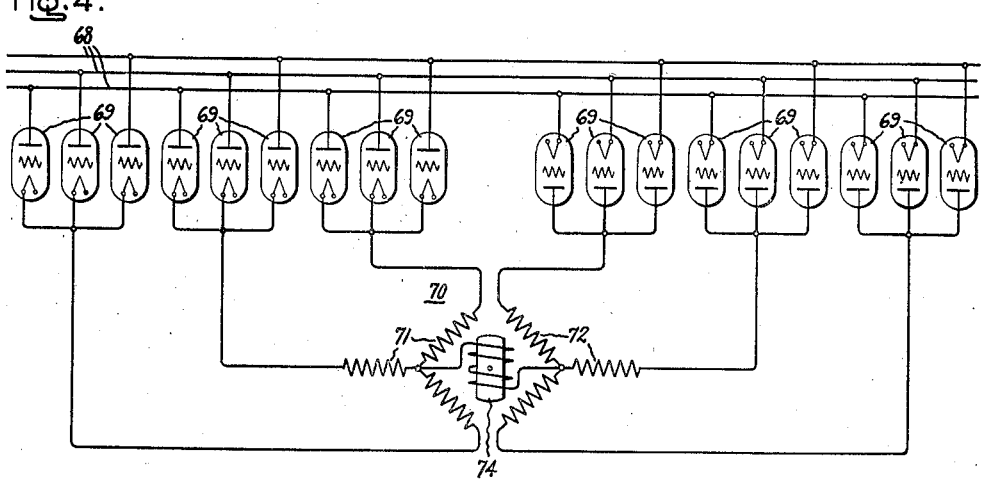

For a better understanding of my invention, together with other and further objects thereof, reference is had to the following description taken in connection with the accompanying drawings and its scope will be pointed out in the appended claims. In the drawings, Fig. 1 illustrates an arrangement embodying the several features of my invention for transmitting energy from a single-phase alternating current supply circuit to a quarter phase alternating current motor of the synchronous type, while Figs. 2, 3 and 4 illustrate the power circuits for various polyphase arrangements which are modifications of the circuit of Fig. 1.

Referring now to Fig. 1 of the drawings, there is illustrated an arrangement for transmitting energy from a single-phase alternating current supply circuit 10 to a quarter phase alternating current motor 11 of the synchronous type comprising armature phase windings 12 and 13 and a rotatable field winding 14. The field winding 14 may be connected in series with the armature windings, as illustrated, in case it is desired to give the motor series characteristics, or, in case shunt characteristics are desired the field winding may be separately excited as will be well understood by those skilled in the art. The terminals of the armature phase winding 12 are connected to the supply circuit 10 through two pairs of similarly connected electric valves 15—16 and 17—18. Similarly, the armature phase winding 13 is connected to supply circuit 10 through two pairs of electric valves 19—20 and 21—22 connected oppositely with respect to the valves 15—18, inclusive. Each of the several electric valves 15—22, inclusive, is provided with an anode, a cathode, and a control grid and may be of any of the several types well known in the art, although I prefer to use valves of the vapor electric discharge type. The control grids of the pairs of valves 15—16 and 17—18 are connected to their respective cathodes through opposite halves of the secondary windings of the grid transformers 23 and 24, respectively, current limiting resistor 27 and negative bias batteries 28, although in some instances the batteries 28 may be satisfactorily omitted. Similarly, the grids of the valves of the pairs 19—20 and 21—22 which have independent cathode potentials are energized through the insulated secondary windings of the transformers 25 and 26, respectively, current limiting resistors 27 and bias batteries 28. In certain instances, it may be desirable also to connect capacitors 29 directly between the grid and cathode of the several electric valves to eliminate substantially the effect of transients in the power circuit upon the grid control circuit, tending to deprive the grid of its proper control, although this feature comprises no part of my present invention but is disclosed and broadly claimed in the copending application of O. W. Livingston, Serial No. 581,396, filed December 16, 1931, and assigned to the same assignee as the present application.

In order to control the grids of the several electric valves under starting and low speed conditions, there is provided a phase shifting arrangement, such for example as the impedance phase shifting circuit 30 comprising an autotransformer 31 connected across the alternating current circuit 10, and a reactor 32 and variable resistor 33 connected across the transformer 31, the output circuit being connected between the electrical midpoint of the transformer 31 and the junction between the reactor 32 and resistor 33. The primary windings of the grid transformers 23—26, inclusive, are energized with the potentials across the resistors 34, 35, 36 and 37, respectively, through a two-position switch 43, while the resistors 34—37, inclusive, are connected in the output circuit of the impedance phase shifting arrangement 30 through the brushes 38, 39, 40 and 41, respectively, of a distributor 42 driven directly from the shaft of the motor 11. When the switch 43 is in its right-hand position it will be noted that the several grid transformers 23—26, inclusive, are disconnected from the impedance phase shifting circuit 30 and are short-circuited. However, the feature of controlling the conductivity of the electric valves by a distributor mechanism driven by the motor forms no part of my present invention, but is disclosed and broadly claimed in my copending application Serial No. 638,361, filed May 11, 1923, and assigned to the same assignee as the present application.

It has been found that the above described grid excitation arrangement for the several electric valves operates most satisfactorily for motor speeds less than approximately half synchronous speed, and that most satisfactory operation for higher motor speeds is obtained when the grids of the several electric valves are excited in accordance with the electromotive force of the motor armature terminals. To secure this type of excitation there is included in the grid circuits of each of the several electric valves 15—22, inclusive, the secondary windings of grid transformers 44—51, inclusive, respectively, the primary windings of which are energized through a two-position switch 52 from the secondary winding 53 of a rotary phase shifting transformer energized directly from the motor terminals, the connections being such that the grid of each of the electric valves receives a grid potential of substantially the same phase as that of the potential of the winding to which it supplies energy. As with the switch 43, the switch 52, when in its right-hand position, is adapted to short-circuit the transformers 44—51, inclusive, and to disconnect them from the rotary phase shifting transformer 54. When operating with the last described grid excitation, the speed of the motor may be controlled by means of the rotary phase shifting transformer 54, but it has been found that in some cases a more satisfactory speed control may be obtained by means of a resistor 55 connected in parallel to the field winding 14. With such an arrangement it is sometimes desirable to include a reactor 56 in series with parallel circuit comprising the field winding 14 and the resistor 55 in order to compensate for the non-inductive path through the resistor 55.

In explaining the operation of the above described apparatus, it will be assumed that the alternating current circuit 10 is energized at any desired frequency, preferably a commercial frequency, that the switch 43 is in its left-hand position, the switch 52 in its right-hand position, and the motor field 14 and associated distributor 42 in their illustated positions. Under these conditions, the primary windings of the grid transformers 44—51, inclusive, are short-circuited so that no potentials are introduced thereby into the grid circuits of the several electric valves and their impedances are negligible. The primary windings of the grid transformers 24 and 25 are energized with the potential appearing across resistors 35 and 36, respectively, through the switch 43, while these resistors are energized with the output potential of the phase shifting circuit 30 through the brushes 39 and 40, respectively, of the distributor 42. For starting the motor 11, the resistor 33 is adjusted until the grid potential supplied by the phase shifting circuit 30 is retarded substantially with respect to the potential of the circuit 10. In this way, electric valves 17 and 18 operate together as a rectifier supplying unidirectional current to the upper terminal of the phase winding 12 of the motor 11, the current passing from the winding 12, through the field winding 14, the reactor 56, the left-hand portion of the armature winding 13 and electric valves 19 and 20, which return the unidirectional current alternately to the proper sides of the supply circuit 10. For example, if the upper side of the circuit 10 be assumed to be positive initially, current will flow through electric valve 17 and the above traced circuit and will be returned through electric valve 20, since the potential of the lower side of the circuit 10 is less than that of the upper and since, as is well understood by those skilled in the art, current will flow from a common source through two electric valves connected in parallel to that circuit having the lower counter-electromotive force. By the illustrated connection of the grid transformers, it will be seen that the grids of the valves of each pair 15—16, 17—18, etc., receive potentials opposite in phase, but since their anode potentials are also opposite in phase, their relative phase displacements are equal. Thus, a relatively low potential unidirectional current is supplied to the upper portion of the phase winding 12 and the left hand portion of the phase winding 13. The distributor 42 is so mounted on the rotor that in the illustrated position of the distributor the field member 14 is in a maximum torque producing position. When the motor rotor has moved through substantially 90 electrical degrees, assuming a counterclockwise rotation, the energizing circuit of the grid transformer 24 through the brush 39 will be broken and the grid transformer 23 will be energized in accordance with the potential across resistor 34, the energizing circuit for which is completed through the brush 38. In a similar manner unidirectional current will now be supplied to the lower portion of the phase winding 12 of the motor 11 thus advancing the axis of resultant magnetization of the motor through 90 electrical degrees so that the motor field member 14 is again in maximum torque producing position. In this manner the current is successively commutated between the terminals of the armature winding 12 and the terminals of the armature winding 13 by means of their associated electric valves, the current always entering through one of the terminals of the phase winding 12, traversing the field winding and being returned from the other phase winding 13 to the circuit 10. With this arrangement the current is always commutated between electric valves carrying current in the same direction so that in case the grid circuit of one of the electric valves should fail for any cause, no short circuit will result on the alternating current supply circuit. At the same time, short circuit currents on the alternating current load circuit, that is the phase windings of the motor 11, are prevented, due to the unilateral conductivity characteristics of the electric valves. As the motor 11 begins to rotate the field winding 14 generates a counter-electromotive force in the phase windings 12 and 13 which opposes the flow of current therethrough so that the phase of the grid potentials of the several electric valves may be advanced by means of the phase shifting arrangement 30 to increase the average voltage applied to the motor terminals, as is well understood by those skilled in the art.

When the motor 11 is operating at low speed, the current may be easily commutated between the electric valves associated with the terminals of one of the phase windings, for example, the valves 15 and 17, because of the fact that the electromotive force of the supply circuit periodically passes through zero many times for each cycle of the current supplied to the motor armature winding, and each time that such electromotive force passes through zero the grid of the electric valve may regain control. At higher speeds, however, where the frequency of the supply circuit is of the same order of magnitude as the frequency of the current supplied to the motor armature windings, this type of commutation would become unsatisfactory due to the fact that the successive half cycles supplied to the motor armature windings might comprise different numbers of half cycles of the supply circuit and thus be unsymmetrical. However, with the above described arrangement, as the motor comes up to speed the field winding 14 generates a counter-electromotive force in the windings 12 and 13, which is effective to commutate the current between the valves even at an intermediate point in the half cycle of the supply circuit, so that the frequency commutation need not be relied upon. With such an arrangement the motor 11 may operate at speeds up to and beyond synchronous speed. However, it has been found that the optimum position of the distributor for low speed conditions does not necessarily correspond with that for high speed conditions since the phase of the generated counter-electromotive force may vary with respect to the motor shaft under heavy load conditions.

It has been found that most satisfactory operation at speeds above approximately half synchronous speed may be obtained by exciting the grids of the several electric valves in accordance with the electromotive force of the motor armature terminals. Such excitation may be obtained by means of the above described apparatus by operating the switch 43 to its right-hand position, thus removing the excitation used for starting the motor and short-circuiting the grid transformers 23—26, inclusive, to minimize their impedance in the grid circuits and operating the switch 52 to its left-hand position. Under these conditions, the grids of the electric valves associated with each motor terminal receive a grid potential substantially in phase with the electromotive force of that terminal. Slight variations in the phase of this grid potential may be obtained by means of the rotary phase shifting transformer 54 to secure the best operating conditions. When operating within this speed range, it has been found that a very satisfactory speed control may be obtained by means of a variable resistor connected in parallel with the field winding 14, as illustrated. With this type of grid excitation and that described in the preceding paragraph, the motor 11, although an alternating current motor of the synchronous type, has speed torque characteristics similar to those of a direct current series motor.

In Fig. 2 there is illustrated a modification of the arrangement shown in Fig. 1 for transmitting energy from a polyphase alternating current supply circuit to a variable speed polyphase alternating current motor of the squirrel cage induction type. In this figure energy is transmitted from a quarter phase alternating current circuit 60 to a quarter phase motor 61 through a plurality of pairs of electric valves 62 connected similarly to the arrangement of Fig. 1 with the exception that energy is drawn from one phase of the alternating current circuit 60, transmitted through the motor 61 and returned to the other phase of the alternating current circuit 60. Such an arrangement is somewhat more simple than those described in connection with Figs. 3 and 4 in that only a single pair of electric valves is required for each of the motor terminals, while it has the disadvantage that the current drawn from the polyphase circuit is unbalanced. Such an arrangement is, therefore, particularly suitable for installations comprising a number of relatively small motors energized from the same circuit, so that the unbalance current drawn by one motor may be compensated by that drawn by another. In this arrangement also the synchronous motor 11 of Fig. 1 is illustrated as replaced by a squirrel cage induction motor 61, in which case the field winding is omitted and the electrical neutrals of the phase windings 63 and 64 of the motor 61 are interconnected through a reactance device 65. Also when operating an induction motor, the distributor 42 must be driven at a speed above that of the motor as for example, through a differential gearing 66, one element of which is driven through a pilot motor 66a. This stepping up of the speed of the distributor is necessary in order to determine the slip of the induction motor and thus its speed for any particular load. The connections to the grids are otherwise as in the arrangement illustrated in Fig. 1. When operating a motor of the induction type, however, in which it inherently draws a lagging current, the current cannot be commutated between the several electric valves by the counter-electromotive force of the motor so that that feature of grid excitation described in connection with Fig. 1 may be omitted. Otherwise, the operation is similar to that described in connection with Fig. 1.

In Fig. 3 is illustrated a further modification of the power circuit of Fig. 1 suitable for transmitting energy from a three-phase alternating current supply circuit to a quarter phase motor. The arrangement is similar to Fig. 1 with the exception that three valves 67 are required for interconnecting each of the motor armature terminals with the three lines of the three-phase alternating current supply circuit 68. The same type of grid control may be utilized as that described in connection with Fig. 1.

There is illustrated in Fig. 4 an arrangement for supplying energy to a three-phase alternating current motor of the synchronous type from a polyphase alternating current supply circuit, for example, a three-phase supply circuit 68. In this arrangement the motor 70 is illustrated as of the synchronous type, but, as will be well understood by those skilled in the art, may be of the induction type as illustrated in Fig. 2. The motor 70 comprises two armature windings 71 and 72 and a field or exciting winding 74 connected between their neutrals. Each of the several terminals of the armature windings 71 and 72 is interconnected with each of the lines of the supply circuit 68 through an electric valve 69. The operation and grid control arrangements are similar to that described in connection with Fig. 1.

While I have described my invention as applied to arrangements for transmitting energy from single-phase, quarter phase or three-phase alternating current circuits, to quarter phase or three-phase alternating current motors, it will be obvious to those skilled in the art that my invention is equally applicable to the transmission of energy between a supply circuit of any number of phases and an alternating current motor of any number of phases.

While I have described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric valve converting system comprising a source of alternating current, electric translating apparatus including a plurality of phase windings, a group of similarly connected electric valves interconnecting one of said phase windings and said source, a second group of electric valves connected oppositely to said first group and interconnecting another of said phase windings and said source, and means for controlling the conductivity of said valves.

2. An electric valve converting system comprising a source of alternating current, electric translating apparatus including a plurality of phase windings, electric valve means for transmitting current from said source to one of said windings, an interconnection between said phase windings, electric valve means for returning said current from another of said windings to said source, and means for controlling the conductivity of said electric valve means.

3. An electric valve converting system comprising a source of alternating current, electric translating apparatus including a plurality of phase windings, a group of electric valves connected to transmit current continuously from said source to one of said windings, an interconnection between said phase windings, a second group of electric valves connected to return said current continuously from another of said windings to said source, and means for controlling the conductivity of said groups of valves.

4. An electric valve converting system comprising an alternating current supply circuit, electric translating apparatus including a pair of inductive windings, an electric valve interconnecting each terminal of one of said windings with each terminal of said alternating current circuit, said valves being similarly connected with respect to said supply circuit, an interconnection between said windings, and an electric valve interconnecting each terminal of the other of said windings with each terminal of said alternating current circuit in a sense opposite to that of said first mentioned valves, and means for controlling the conductivity of said valves.

5. An electric valve converting system comprising an alternating current supply circuit, electric translating apparatus including a pair of inductive windings each provided with an electrical neutral, a reactance device interconnecting said neutrals, an electric valve interconnecting each terminal of one of said windings and each terminal of said alternating current circuit, said valves being similarly connected with respect to said supply circuit, an electric valve interconnecting each terminal of the other of said windings with each terminal of said supply circuit in a sense opposite to that of said first mentioned valves, and means for controlling the conductivity of said valves.

6. An electric valve converting system comprising a polyphase alternating current supply circuit, electric translating apparatus including a plurality of inductive windings, electric valve means for supplying current to one of said windings from one phase of said supply circuit, a connection between said windings, other electric valve means for returning said current from another of said windings to another phase of said supply circuit, and means for controlling the conductivity of said electric valve means.

7. An electric valve converting system comprising a polyphase alternating current supply circuit, polyphase electric translating apparatus comprising a pair of inductive windings each provided with an electrical neutral, a reactance device interconnecting said neutrals, an electric valve interconnecting each terminal of one of said windings with one phase of said supply circuit, said valves being similarly connected with respect to said supply circuit, an electric valve interconnecting each terminal of the other of said windings with another phase of said supply circuit in a sense opposite to that of said first mentioned valves, and means for controlling the conductivity of said valves.

8. An electric valve converting system comprising an alternating current supply circuit, polyphase electric translating apparatus including a pair of polyphase inductive networks each provided with an electrical neutral, a reactance device interconnecting said neutrals, an electric valve interconnecting each phase terminal of one of said networks with each terminal of said supply circuit, said valves being similarly connected with respect to said supply circuit, an electric valve interconnecting each phase terminal of the other of said networks with each terminal of said supply circuit in a sense opposite to that of said first mentioned valves, and means for controlling the conductivity of said valves.

9. An electric valve converting system comprising an alternating current supply circuit, polyphase electric translating apparatus comprising a plurality of phase windings, electric valve means connecting said phase windings across said source in series circuit relation, and means for controlling the conductivity of said electric valve means.

10. The method of energizing a polyphase electric translating apparatus comprising a plurality of phase windings from a source of alternating current which comprises continuously supplying current from said source to one of said phase windings, transmitting said current to another of said phase windings, and continuously returning said current from said last mentioned phase winding to said source.

11. The method of energizing a polyphase electric translating apparatus comprising a plurality of phase windings from a source of alternating current which comprises continuously supplying unidirectional current to one of said phase windings, periodically changing the point of entrance of said current from one terminal to the other, transmitting said unidirectional current to a second of said phase windings, continuously returning said current from said second phase winding to said source, and periodically changing the point of exit of said current from one terminal to the other of said second winding.

12. An electric valve frequency changing system comprising a source of alternating current, a load circuit comprising a plurality of phase windings, a group of similarly connected electric valves interconnecting one of said phase windings and said source, a second group of electric valves interconnecting another of said phase windings and said source, said second group of valves being connected oppositely to said first group with respect to said source, and means for controlling the conductivities of said valves at a variable frequency to supply variable frequency alternating current to said load circuit.

13. An electric valve converting system comprising a source of alternating current, an alternating current dynamo-electric machine provided with a plurality of phase windings, a group of similarly connected electric valves interconnecting one of said phase windings and said source, an interconnection between said phase windings, a second group of electric valves interconnecting another of said phase windings and said source, said second group of valves being connected oppositely to said first group with respect to said source, and means for controlling the conductivities of said valves at a variable frequency to vary the speed of said machine.

14. An electric valve converting system comprising a source of current, a dynamo-electric machine provided with a plurality of armature terminals, a plurality of electric valves interconnecting said source and said terminals for commutating the current therebetween, said system including a circuit carrying unidirectional current, and a reactance device connected in said unidirectional current circuit to maintain substantially steady current therein and serving as a source of excitation for said machine.

15. An electric valve converting system comprising a source of alternating current, a dynamo-electric machine provided with a plurality of armature phase windings, a plurality of electric valves interconnecting said phase windings and said source and acting to rectify said alternating current and commutate it between said phase windings, said phase windings and valves being connected to form a direct current circuit, and a reactance device in said direct current circuit to smooth out the ripples of the supply frequency, said reactance serving also as an exciting winding for said machine.

16. An electric valve converting system comprising a source of current, a motor provided with a pair of armature phase windings each provided with an electrical neutral, a first group of similarly connected electric valves interconnecting one of said windings and said source, an exciting winding for said motor connected between the neutrals of said windings, a second group of electric valves interconnecting the other phase winding with said source, said second group being connected oppositely to said first group with respect to said source, and means for controlling the conductivity of said valves.

17. An electric valve converting system comprising a source of current, a motor provided with a plurality of armature phase windings, a plurality of electric valves interconnecting said source and said windings for commutating the current therebetween, said system including a circuit carrying unidirectional current, a reactance device connected in said unidirectional current circuit to maintain substantially steady current therein and serving as a source of excitation for said motor, and a variable impedance device in circuit with said reactance device to vary the speed-torque characteristics of said motor.

18. An electric valve converting system comprising a source of current, a motor provided with a pair of armature phase windings each having an electrical neutral, a first group of similarly connected electric valves interconnecting one of said windings and said source, an exciting winding for said motor connected between the neutrals of said windings, a second group of electric valves interconnecting the other phase winding with said source, said second group being connected oppositely to said first group with respect to said source, means for controlling the conductivity of said valves in accordance with an operating condition of said motor, whereby the motor is given series motor characteristics, and a variable impedance device in circuit with said exciting winding for varying the speed-torque characterstics of said motor.

19. An electric valve converting system comprising a source of current, a motor provided with a pair of armature phase windings each having an electrical neutral, a first group of similarly connected electric valves interconnecting one of said windings and said source, an exciting winding for said motor connected between the neutrals of said windings, a second group of electric valves interconnecting the other phase winding with said source, said second group being connected oppositely to said first group with respect to said source, means for controlling the conductivity of said valves in accordance with an operating condition of said motor, whereby said motor is given series motor characteristics, a reactance device in series with said exciting winding, and a variable resistor connected in parallel with said exciting winding to vary the speed-torque characteristics of said motor.

20. An electric valve converting system comprising a source of alternating current, an electric translating apparatus, a plurality of electric valves interconnecting said source and said apparatus, each of said valves being provided with an anode, a cathode, and a control grid, a grid circuit for each of said valves including a distributor and an alternating potential derived from said source, and means for varying the phase of said alternating potential to vary the energization of said apparatus.

21. An electric valve converting system comprising a source of alternating current, a dynamo-electric machine provided with a plurality of armature terminals, a plurality of electric valves interconnecting said source and said terminals for commutating the current therebetween, each of said valves being provided with an anode, a cathode, and a control grid, a distributor provided with a brush for each of said armature terminals, a phase shifting device energized from said source, a plurality of circuits energized from said phase shifting device and including a brush of said distributor and an impedance device, and a circuit for exciting the grids of the valves associated with each terminal of said armature winding with the potential across one of said impedance devices.

22. An electric valve converting system comprising a source of alternating current, a motor provided with a plurality of armature terminals, a plurality of electric valves interconnecting said source and said terminals for commutating the current therebetween, each of said valves being provided with an anode, a cathode, and a control grid, a direct current exciting winding for said motor, a distributor driven by said motor and provided with a brush for each of said motor terminals, a phase shifting device energized from said source, a plurality of circuits energized from said phase shifting device and including a brush of said distributor and a resistor, and a circuit for exciting the grids of the valves associated with each terminal of said armature winding with the potential across one of said resistors.

23. The method of operating a dynamo-electric machine provided with a plurality of armature windings and associated terminals from a source of alternating current through a plurality of electric valves provided with control grids which comprises applying successively to the grids of the valves associated with the several armature terminals an alternating potential derived from said source, and varying the phase of said alternating potential to vary the energization of said machine.

24. The method of operating a dynamo-electric machine provided with a plurality of armature windings and associated terminals from a source of alternating current through a plurality of electric valves provided with control grids which comprises applying an alternating potential derived from said source to the grids of the valves associated with the terminal of an armature winding in torque producing position, successively transferring said grid excitation to the valves associated with successive armature terminals as their respective windings move into torque producing position, and varying the phase of said alternating potential to vary the energization of said machine.

25. The method of starting a motor provided with a plurality of armature windings and associated terminals from a source of alternating current through a plurality of electric valves provided with control grids which comprises applying to the grids of the valves associated with the terminal of an armature winding in torque producing position, an alternating potential derived from said source and retarded in phase with respect thereto, successively transferring said grid excitation to the valves associated with successive armature terminals as their respective windings move into torque producing position, and advancing the phase of said alternating potential to increase the energization of said motor as it increases in speed.

26. An electric valve converting system comprising a source of current, a dynamo-electric machine provided with a plurality of armature terminals, a plurality of electric valves interconnecting said source and said terminals for commutating the current therebetween, each of said valves being provided with a control grid, a direct current exciting winding for said machine, and grid circuits for the several valves energized from said armature terminals.

27. An electric valve converting system comprising a source of current, a dynamo-electric machine provided with a plurality of armature terminals, a plurality of electric valves interconnecting said source and said terminals for commutating the current therebetween, each of said valves being provided with a control grid, a direct current exciting winding for said machine, means for exciting said grids in accordance with the counter-electromotive force of said machine, and means for determining the phase relation between said electromotive force and said grid excitation.

28. An electric valve converting system comprising a source of current, a motor provided with a plurality of armature terminals, a plurality of electric valves interconnecting said source and said terminals for commutating the current therebetween, each of said valves being provided with a control grid, a direct current exciting winding for said motor, a control circuit for said grids energized from said motor terminals, and a manually operable phase shifting device interposed in said control circuit.

29. An electric valve converting system comprising a source of alternating current, a motor provided with a plurality of armature terminals, a plurality of electric valves interconnecting said source and said terminals for commutating the current therebetween, each of said valves being provided with a control grid, a direct current exciting winding for said motor, a grid circuit for each of said valves including a source of potential derived from said armature terminals, a distributor, and a source of alternating potential derived from said source, means for varying the phase of said alternating potential to vary the energization of said motor, and means for selectively disconnecting either of the sources of potential in said grid circuit.

30. An electric valve converting system comprising a source of alternating current, a motor provided with a plurality of armature terminals, a plurality of electric valves interconnecting said source and said terminals for commutating the current therebetween, each of said valves being provided with a control grid, a direct current exciting winding for said motor, means for exciting said grids for motor speeds below approximately half synchronous speed comprising a distributor driven by said motor, a source of alternating potential derived from said source of alternating current, and means for varying the phase of said alternating potential to vary the speed of the motor, and means for exciting said grids for higher motor speeds comprising a source of grid potential derived from said armature terminals.

31. The method of starting and operating a motor provided with a plurality of armature windings and associated terminals from a source of alternating current through a plurality of electric valves provided with control grids which comprises applying to the grids of the valves associated with the terminal of an armature winding in torque producing position an alternating potential derived from said source and retarded in phase with respect thereto, successively transferring said grid excitation to the valves associated with successive armature terminals as their respective windings move into torque producing position, advancing the phase of said alternating potential to increase the energization of said motor as it increases in speed, and thereafter impressing upon said grids a potential determined by the counter-electromotive force of said motor.

32. An electric valve converting system comprising a source of alternating current, a dynamo-electric machine provided with a plurality of armature terminals, and a plurality of electric valves interconnecting said source and said terminals for commutating the current therebetween, said system including a reactance device provided with an exciting winding energized with a unidirectional magnetomotive force, said reactance device serving as a source of excitation for said machine.

ERNST F. W. ALEXANDERSON.